March 23, 1926.
A. G. SPINNEY
1,577,498
QUICK RELEASE SPEED AMPLIFIER
Filed April 6, 1925    2 Sheets-Sheet 2
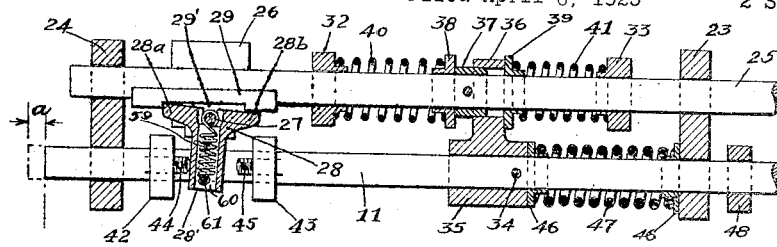
Fig.4
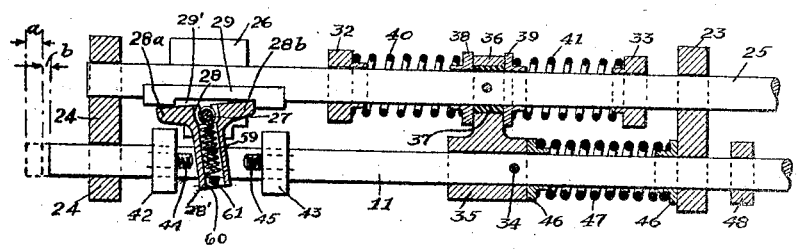
Fig.5
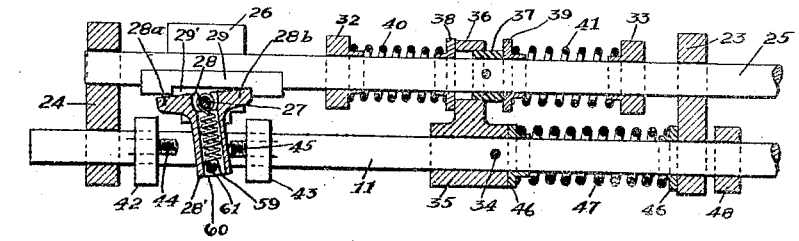
Fig.6
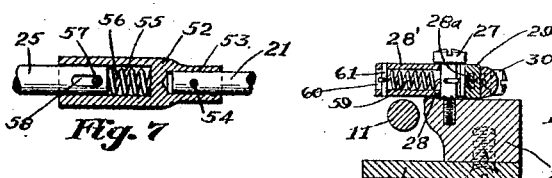
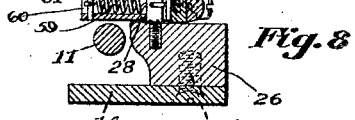
Fig.8
Fig.7
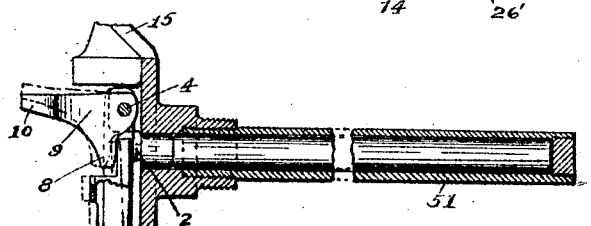
Fig.9
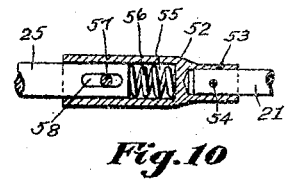
Fig.10
Inventor:
Andrew G. Spinney Patented Mar. 23, 1926.

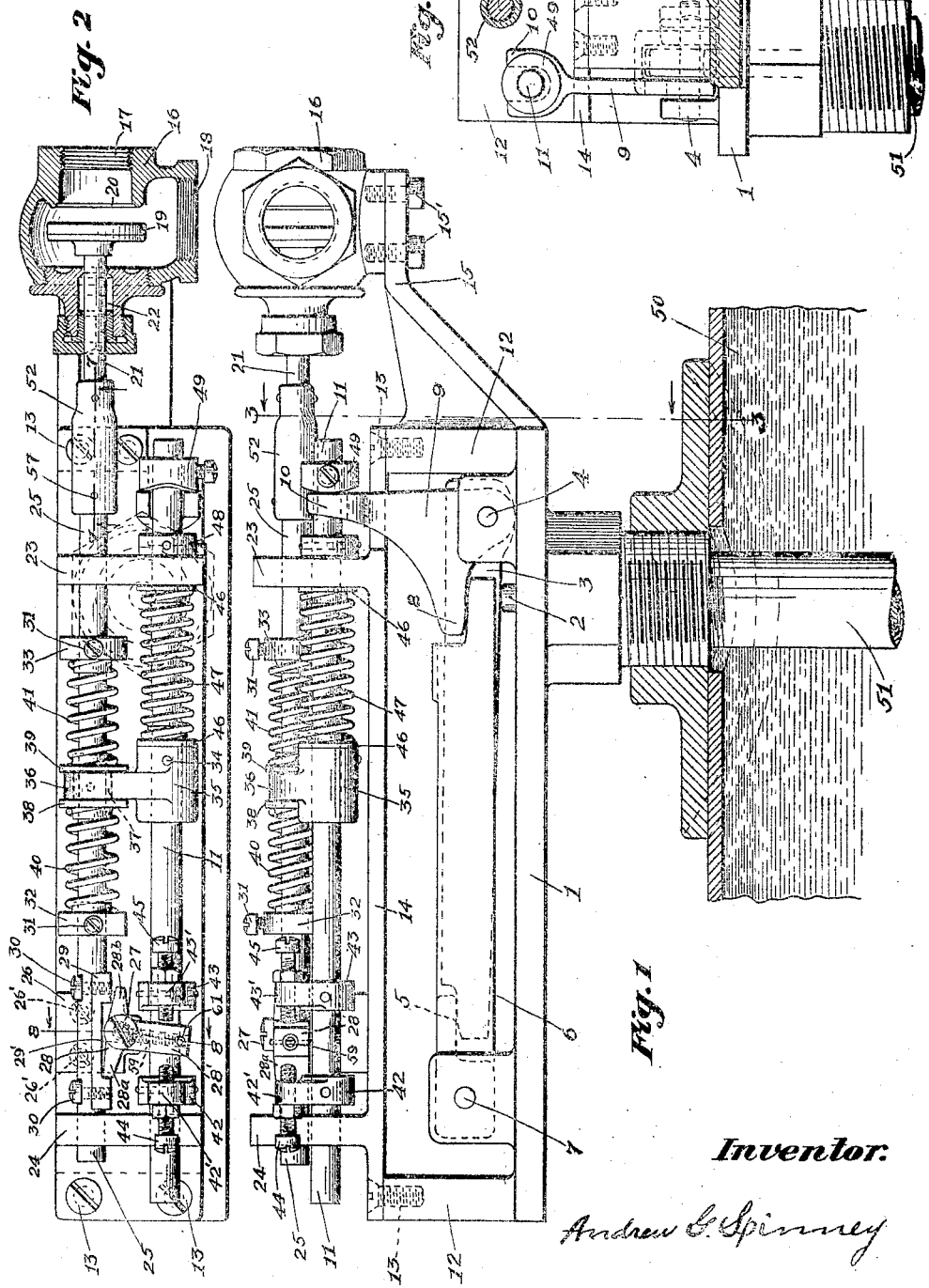

1,577,498

UNITED STATES PATENT OFFICE.

ANDREW G. SPINNEY, OF PORTLAND, MAINE, ASSIGNOR OF ONE-HALF TO CHARLES A. TWIGG, OF PORTLAND, MAINE.

QUICK-RELEASE SPEED AMPLIFIER.

Application filed April 6, 1925. Serial No. 21,254.

*To all whom it may concern:*

Be it known that I, ANDREW G. SPINNEY, a citizen of the United States, residing at Portland, in the county of Cumberland and State of Maine, have invented new and useful Improvements in a Quick-Release Speed Amplifier, of which the following is a specification.

My invention relates, principally, to a device which may be employed to convert, automatically, a slow, steady primary movement, often of great potency, into a sudden, precipitate secondary movement or reciprocation of certain elements which require to be actuated intermittently, and in a very rapid manner.

One of the objects of my invention is to produce an apparatus which may be used in connection with such service as the quick opening or closing of valves, a snappy movement as the "on" and "off" of electric switches, a feed reverse mechanism for certain classes of machine tools and in any situation where the source of the actuating power may be fluctuating and adaptable of control.

In my present application I have illustrated and described the device as it would function in the capacity of a temperature regulator for hot water tanks, as its application for this service is particularly effective.

With the increasing use of gas fuel for water heating purposes it is always convenient, and sometimes absolutely essential, to provide with the heater an automatic regulating mechanism of some sort to serve as a control for the gas burner.

In the use of hot water tanks it frequently becomes necessary to draw a large amount of hot water at one time. The hot water will at once be replaced by cold water. With some of the earlier types of thermostatic control devices the gas valve will start to open immediately upon the temperature of the tank water beginning to lower. This opening will increase by degrees until the thermo tube has contracted to its limit. As the water gradually becomes heated the thermo tube will slowly expand; meanwhile the gas valve, controlled directly by the thermostat, will begin to close, and result in a wire-drawing of the gas through the valve until such time as it becomes fully closed. The thermostat functions as a result of the rise in temperature of the water much more slowly than from a lowering of the temperature of the same, due to the fact that it requires a longer period to heat the water than it does to empty the tank. The gas is therefore wire-drawing over a considerable period of the heating operation and delays the latter materially. Another prolific source of trouble caused by the wire-drawing of the gas through the valve is what is known as "back-lighting", or ignition of the gas in the mixing tube.

In contrast to this method of operating the valve, my device holds the valve "full open" from the time the theromo-tube is fully contracted until the desired rise of temperature in the water is reached,—and then rapidly closes.

My amplifier is compactly built, may be attached to any hot water tank and the gas line connected to the valve, which may, or may not be, a built in element in the structure. There is provision made for adjusting the parts so that a variable range of temperature of the water may be obtained.

In the following specification and in the drawings annexed, I have described and illustrated, respectively, one embodiment of my invention, and in the drawings, in which like characters of reference refer to similar parts in all views, Fig. 1 is a side elevation of the amplifier, showing a gas valve and a fragmentary view of the thermostat;

Fig. 2 is a plan view of the same, with the valve in section;

Fig. 3 is an end elevation, with the valve eliminated;

Figs. 4, 5 and 6 represent different positions of the parts during different periods in the sequence of operation;

Fig. 7 is a sectional view of the shock absorber, taken on line 7—7, Fig. 2;

Fig. 8 is a section on line 8—8, Fig. 2,

Fig. 9 is a central view through the thermostat and connecting levers, and Fig. 10 is a section through the shock absorber.

Referring to the drawings, 1 is the base of a conventional type thermostatic actuator, having the usual elements characteristic of such mechanisms. The lifting pin 2 contacts with the lever 3 which is pivoted at 4. This lever (3) contacts at its outer end, at 5, with the lever 6 which is pivoted at 7. Contacting with the lever 6 is the horizontal arm 8 of the rocker 9. An upright arm 10, at substantially a right angle to the arm 8, is yoked and partly surrounds the shaft 11.

Extending upwardly from the base 1 are standards 12 upon which is secured, by the screws 13, the base 14 of the amplifier. On a bracket 15 projecting from one of the standards 12 is a gas valve body 16, secured to the bracket by the screws 15', and having an inlet connection at 17 and an outlet at 18. The valve 19 when in closed position rests on the seat 20, and is fixed on the spindle 21. A stuffing box may be supplied, as seen at 22.

Rising from the amplifier base (14) are two uprights 23 and 24, through which are bored holes serving as bearings for the shafts 11 and 25. At a spaced distance from the upright 24 is a block 26 secured to the base (14) by the screws 26'. Upon this block is a stud 27 and operating on the latter is a two-way pawl 28 having dogs 28ª and 28ᵇ and an arm 28' extending over and beyond the shaft 11.

Set into the shaft 25 in contiguous relation to the pawl 28, is a recessed plate 29 secured to the shaft by the screws 30. It will be noticed that the length of the recess 29' is less than the over all length of the two pawl dogs 28ª and 28ᵇ. Secured to the shaft 25, by set screws 31, are the collars 32 and 33, and fixed on the shaft 11 by means of the pin 34 is the sleeve 35 with an arm 36 extending therefrom to and around the bushing 37 which is secured to the shaft 25 fixedly.

On each side of the arm 36, and slidable on the shaft 25, are collars 38 and 39. Interposed between the collars 32 and 38 and also between the collars 33 and 39, are the helical springs 40 and 41, respectively. Pinned to the shaft 11 are knock-off screw collars 42 and 43, and through extensions 42' and 43' thereon, operate the knock-off screws 44 and 45, respectively,—the latter members being susceptible of adjustment in and out of the extensions.

Thrusting on collars 46 placed on the shaft 11 between the sleeve 35 and the upright 23, is the helical spring 47, and on the same shaft (11), outside of the upright 23 is fixed a collar 48 which limits the movement of the shaft 11 against the expansion of the spring 47. On the outer end of the shaft 11 is a collar 49 having a convex face abutting on the arm 10.

In Figs. 1 and 2 the parts, as drawn, represent the position they assume when the valve is open.

In operation, the temperature of the water in the tank 50 having risen sufficiently, the lifting pin 2 is moved a short distance out of the thermo tube 51, and, through the agency of the several intervening levers, oscillates the rocker 9 so that the arm 10 forces the collar 49, the shaft 11 and all parts mounted thereon in a direction toward the right, as viewed in Figs. 1, 2, 4, 5 and 6. As this movement to the right continues the parts will shortly come to the position in which they are shown in Fig. 4, after moving a distance represented by the character "a". At this point the sleeve 35 has compressed the spring 47, the arm 36, moving along the bushing 37, has compressed the spring 41 and the screw 44 has been brought into contact with the arm 28'. The actuation of the parts thus far has been without effect on the spring 40, and the valve 19 is still off its seat.

A slight further movement, however, of the shaft 11 in the same direction as before, represented by "b", will cause the pawl dog 28ª to become disengaged from the plate 29 and the expanding power stored in the spring 41 will force the shaft 25 forwardly, or to the right as seen in the drawings, and close the valve, cutting off further admission of gas to the burner, bringing the two springs 40 and 41 into their normal or equalized positions, relative to each other, and the pawl dog 28ᵇ will now be located in the opposite end of the recess 29' in the plate 29.

The arrangement of the different parts are now as shown in Fig. 5 and at this time the valve is closed.

The foregoing describes the action of the device in closing the valve. The valve opening procedure is quite similar except that for this duty the spring 47, which when the valve is closed is under compression, functions as the power agent and moves the shaft 11 to the left, compressing the spring 40 and releases the pawl dog 28ᵇ. Previous to the opening of the valve the temperature of the tank water must, of course, have been lowered so as to have allowed the lifting pin 2 to descend and the other power actuating parts to recede to their original positions as seen in Figs. 1 and 2. Fig. 4 is the antithesis of Fig. 6,—the former showing the position of the parts when the valve is open but just on the point of closing, and the latter Fig. 6 showing these parts when the valve is closed but immediately preceding its opening.

In order to provide proper expansive power for the springs 40 and 41 to open and close, respectively, the valve 19, I may adjust the collars 32 and 33, on the shaft 25, bringing the two springs into proper expansibility.

I also provide a shock absorber which I mount on the valve spindle 21 for the chief purpose of alleviating somewhat the impact or pound of the valve on its seating, incident to closing. In Fig. 7 I show a sectional view of this element, which consists of a sleeve 52, in a bore 53 in which I fix the valve spindle 21 by means of the pin 54. On the opposite end of the sleeve a bore 55 receives the shaft 25 and between the end of the latter and the bottom of the bore 55 I insert the helical spring 56. This spring is always under a compression of a predetermined amount. To prevent the sleeve from withdrawal from off the shaft 25 I fix a pin 57 in and through the sleeve and through a slot 58 in the shaft 25. This slot allows the shaft to telescope the sleeve a certain amount and makes the connection between the shaft 25 and the valve spindle 21 yielding.

Another purpose which this shock absorber serves is to keep the valve, when in closed position, seated with an elastic pressure. When the pawl dog 28$^b$ is engaged, the pin 57 is midway of the slot 58, and the spring 56 exerts a strain on the shaft 25 and holds the valve yieldingly. This condition is brought about by the fact that when the pawl dog 28$^a$ disengages, the impact of the valve seating will allow the shaft 25 to telescope the sleeve 52 sufficiently to allow the pawl dog 28$^b$ to engage before the pin 57 can reach the end of the slot 58, as seen in Fig. 7.

Referring to Fig. 8 wherein is shown a section through the arm 28' of the two-way pawl 28, 59 is a spring under tension, located in a bore 60 of the arm. One end of the spring is secured to the stud 27 and the other end to a pin 61. This spring has the effect of keeping the pawl constantly in contact with the plate 29 and causes the dogs 28$^a$ and 28$^b$ to engage the shoulders of the recess 29' more quickly and firmly.

Having thus described my invention, what I claim is:

1. In a quick-release speed-amplifier, consisting of a base, bearings on said base, a shaft reciprocable in said bearings, means to actuate said shaft, a second shaft reciprocable in other bearings on said base,—said second shaft to be in parallel relation to said first shaft, means on said first shaft co-acting with means on said second shaft whereby a yielding pressure may be exerted on said second shaft, alternately, forwardly and backwardly, longitudinally of the same, a stop on said second shaft, a two-way pawl pivotally mounted on said base and adapted to engage said stop, alternately, in forward and backward movements of said second shaft, and means on said first shaft for tripping said pawl whereby the acquired energy stored in said second shaft may be precipitately released.

2. In a quick-release speed-amplifier, consisting of a base, bearings on said base, a shaft reciprocable in said bearings, means to actuate said shaft, a second shaft reciprocable in other bearings on said base, means on said first shaft co-acting with means on said second shaft whereby a yielding pressure may be exerted on said second shaft, alternately, backwardly and forwardly, longitudinally of said shaft, a stop on said second shaft, a two-way pawl pivotally mounted on said base and adapted to alternately engage said stop in its forward and backward movements, a pawl arm on said two-way pawl projecting outwardly and centrally of said pawl, knock-off screws on said first shaft, one screw on one side and another of the said screws on the other side of the said pawl arm, and in alignment therewith, said knock-off screws in co-action with the reciprocation of said first shaft to constitute means whereby said pawl may release said stop on said second shaft at predetermined times.

3. In a quick-release speed-amplifier, consisting of a base, bearings on said base, a shaft adapted to reciprocate in said bearings, means to actuate said shaft, in one direction, positively, means to actuate said shaft in the opposite direction, yieldingly, means to restrict the movement of said shaft when under yielding actuation, a second shaft reciprocable in other bearings on said base, said second shaft to be in parallel relation to said first shaft, a sleeve fixed on said first shaft, an arm on said sleeve having a bore therein, a collar fixed to said second shaft and adapted to reciprocate, intermittently, within said bore of said arm, spring adjustment collars adjustably fixed on said second shaft, one of said collars to be on each side of said first named collar and a spaced distance therefrom, spring abutment collars loosely mounted on said second shaft, one to be on each side of said first mentioned collar and normally in contiguous relation therewith, helical springs interposed between the adjacent fixed and loosely mounted spring abutment collars on each side of the said first named collar, said springs adapted to yieldingly resist any movement of their respective and adjacent loosely mounted abutment collars away from said first named collar, dogging means on said second shaft, adapted to hold the said second shaft against the yielding pressure of said springs, means on said first shaft to trip said dogging means at predetermined times, means to cushion said second shaft from the impact due to its release from said dogging means, and means for varying the potency of the yielding pressure in said springs by varying the position, longitudinally, of said tripping means on said first mentioned shaft, substantially as described.

ANDREW G. SPINNEY.